United States Patent
Rössl (10) Patent No.: US 11,948,041 B2
(45) Date of Patent: Apr. 2, 2024

(54) ELECTRONIC SHELF LABELLING SYSTEM WITH A POWER SUPPLY

(71) Applicant: SES-IMAGOTAG GMBH, Fernitz-Mellach (AT)

(72) Inventor: Andreas Rössl, Fernitz-Mellach (AT)

(73) Assignee: SES-IMAGOTAG GmbH, Fernitz-Mellach (AT)

(*) Notice: Subject to any disclaimer, the term of this patent is extended or adjusted under 35 U.S.C. 154(b) by 143 days.

(21) Appl. No.: 17/617,679

(22) PCT Filed: Jun. 14, 2019

(86) PCT No.: PCT/EP2019/065715
§ 371 (c)(1),
(2) Date: Dec. 9, 2021

(87) PCT Pub. No.: WO2020/249231
PCT Pub. Date: Dec. 17, 2020

(65) Prior Publication Data
US 2022/0253617 A1    Aug. 11, 2022

(51) Int. Cl.
*G06K 7/10*    (2006.01)

(52) U.S. Cl.
CPC ............... *G06K 7/10366* (2013.01)

(58) Field of Classification Search
CPC .................................. G06K 7/10366
See application file for complete search history.

(56) References Cited

U.S. PATENT DOCUMENTS

2018/0268745 A1*  9/2018  de Haas ............ H01R 25/142

\* cited by examiner

*Primary Examiner* — Jamara A Franklin
(74) *Attorney, Agent, or Firm* — Dennemeyer & Associates, LLC (57) ABSTRACT

The invention relates to an electronic shelf labelling system comprising at least one electronic shelf label that is designed such that it can be contactlessly supplied with power, and at least one shelf edge strip on which at least one shelf label of this type is secured, and an electronic power supply assigned to the shelf edge strip, in particular assigned only to this one shelf edge strip, which is designed to contactlessly supply power to the at least one electronic shelf label secured to said shelf edge strip.

14 Claims, 6 Drawing Sheets

ELECTRONIC SHELF LABELLING SYSTEM WITH A POWER SUPPLY

TECHNICAL FIELD

The invention relates to an electronic shelf label system with energy supply via a shelf edge strip.

BACKGROUND

An electronic shelf label system for displaying information with the aid of electronic shelf label displays, referred to below as ESL system for short, wherein which ESL stands for "electronic shelf label", with energy supply via a shelf edge strip is known, for example, from international patent application WO 2017/153481 A1. In this known ESL system, a shelf edge strip to which the ESLs are attached is equipped with electrical conductor tracks which are connected to a power supply unit for electrically supplying the ESLs. The ESLs have on their rear side resilient contacts, with which the conductor tracks are contacted in order to connect the ESLs electrically to the power supply unit.

However, the known energy supply is relatively expensive because a multiplicity of in particular individual mechanical components must be provided in each ESL and in each shelf edge strip. These mechanical components are subject to natural wear. In addition, the mechanical components can become dirty or even damaged if not handled properly. This can lead to malfunctions during operation. The mechanical components are also associated with considerable additional outlay in both production and maintenance, which is necessary during operation to avoid the aforementioned problems. The known system also has the limitation that the ESLs cannot be positioned or displaced along the shelf edge strip in any desired manner.

The object of the invention is to provide an improved ESL system in which the aforementioned problems are overcome.

SUMMARY OF THE INVENTION

This object is achieved by an electronic shelf label system, which comprises: at least one electronic shelf label, preferably realized as an electronic shelf label display, the shelf label being designed such that it can be supplied with energy contactlessly, and at least one shelf edge strip, to which at least one shelf label of this type is fastened, and an electronic energy supply device which is assigned to the shelf edge strip, in particular assigned only to this one shelf edge strip, and is designed to supply energy contactlessly to the at least one electronic shelf label fastened to said shelf edge strip.

The object is furthermore achieved by the use of an electronic energy supply device for contactless energy supply, in particular also for contactless communication supply, of at least one shelf label, preferably realized as a shelf label display, the shelf label being designed such that it can be supplied with energy contactlessly, in particular also for contactless communication, with an, in particular one single, shelf edge strip to which the at least one shelf label is fastened.

The measures according to the invention are associated with the advantage that energy is supplied to the shelf label completely without mechanical contacts and the problems associated therewith. The system can thus be produced much more cost-effectively and operated de facto without maintenance because mechanical components, in particular those requiring maintenance, are avoided.

Further particularly advantageous embodiments and developments of the invention result from the dependent claims and also the following description. In this case, features of one claim category can be developed in accordance with the features of the other claim category, so that the effects and advantages listed in connection with the one claim category are also present for the other claim categories.

Such an electronic shelf label can provide or fulfil a wide variety of functionalities or functions. For example, the shelf label can be configured or accordingly designed e.g. to detect environmental parameters such as e.g. for temperature or moisture detection, or as an input element for receiving an input interaction of a user (e.g. detecting a fingerprint or a key press) or else as a display medium for presenting information for the user, namely as a shelf label display. In any case, the shelf label is designed such that it can be attached to the shelf edge strip in question and is supplied there with energy in the manner described in detail in the following.

The shelf label can have a proprietary interface for energy transmission, which can be used solely for this purpose. However, the shelf label preferably has a standardized energy transmission interface, which can be designed for example according to the RFID standard (RFID stands for Radio Frequency Identification, and an applicable standard is e.g. ISO/IEC/18000 etc.). Particularly preferably, however, the shelf label comprises a first NFC interface for contactless energy supply thereto. This is associated with the advantage that this NFC interface can be used not only for local energy transmission at the shelving unit or shelf edge strip but also for bidirectional contactless communication directly there. In particular problems in wireless traffic caused by other radio systems in a business are avoided thereby, because they are usually situated far away from the shelving units where the shelf label is installed and therefore have hardly any or no influence at all on the local energy transmission or communication between the communication partners positioned close to each other directly on the shelf edge strip. Here, NFC stands for Near Field Communication, and the applicable standards are e.g. ISO/IEC 13157, -16353, -22536, -28361, etc.

The shelf label, when configured as a shelf label display, can comprise an energy-saving display unit such as e.g. an LCD display. In particular, however, the technology that is used is based on electronic ink or electronic paper technology. A display unit of this type therefore has a reflective screen, also termed electronic paper display, abbreviated EPD, in technical jargon, and is realized with the aid of "electronic paper", abbreviated to "e-paper" or "e-ink". These terms substantially stand for the principle of an electrophoretic display which contains e.g. positively charged white particles and negatively charged black particles in a transparent, viscous polymer. By briefly applying a voltage at electrodes, between which the medium made up of particles and polymer is arranged, either the black particles are placed in front of the white particles or vice versa in the viewing direction. This arrangement is then maintained for a relatively long time (e.g. a few weeks) without further energy supply. If the display is segmented accordingly, e.g. letters, numbers or images can be realized with relatively high resolution in order to display said information. Such a reflective screen can however also be realized with the aid of other technologies, which are known e.g. under the term "electrowetting" or "MEMS". The screen can be designed e.g. as mentioned for black and white display, for greyscale display, for black, white and red display or else for black, white and yellow display. Future developments, which enable a full-colour or even multi-colour display, should also be included. Such a screen is very generally a reflective, that is to say passive, non-self-illuminating display, in which the—relatively static—information display is based on light generated by an external (artificial or natural) light source shining onto the screen and being reflected from there to the observer.

The display unit is supplied with energy on the one hand and data on the other hand, which can represent commands for controlling the display unit or else image contents, with the aid of the first NFC interface. During energy supply via the NFC interface, the said data can also be transmitted via this NFC interface, said data being processed by the display unit to the effect that the image content of its screen changes. After the image content has finished changing, corresponding status information representing the successful change of the image content can also be output by the display unit via the NFC interface. After the image content has finished changing, where applicable also after the status information has been output, the energy supply via the NFC interface can be terminated, after which the image content of the screen remains unchanged until the next desired change.

The use of said technologies in particular allows the shelf label to be realized in particular as a shelf label display without its own energy supply such as a battery or a rechargeable battery for example, which are both relatively expensive. For the purposes of maintenance or replacement of the battery or rechargeable battery, a conventional shelf label must also be designed such that said energy storage devices are replaceable. Where necessary, only a capacitor for short-term, temporary smoothing or stabilization of the internal supply voltage is still used in the shelf label. The shelf label is therefore designed such that its electronics for communication or for updating the screen content or for receiving user interaction or for detecting environmental parameters, in particular its electronic control, is only active when it is supplied with the aid of the external electronic supply device. The housing can be completely and permanently encapsulated, because it is no longer necessary to replace the energy storage device, and therefore it can only be opened for recycling purposes (e.g. with a special tool).

A shelf label which is reduced to a few, absolutely necessary electronic components and is therefore also extremely inexpensive can thus be realized. This extremely reduced shelf label only needs still to have a basic functionality, such as e.g. standardized NFC communication with standardized energy supply during the NFC communication, which is realized with the aid of a commercially available NFC module. Updates of the screen of the energy-saving display unit and the status report about that are not dealt with directly by the shelf label display in a communication with an access point, as is the case in known systems, but rather is handled by the interposed supply device, which for its part is in contact with the access point via a suitable (and essentially freely selectable) communication method, which is discussed in detail in the following. The same applies analogously for the other possible functionalities of the shelf label that are mentioned.

According to one aspect, the supply device comprises at least one conductor loop formed on the shelf edge strip, and an electronic supply unit which is coupled to the at least one conductor loop, in particular electrically conductively connected to the two line ends thereof, referred to below as loop connectors. The supply unit is provided to transmit the energy for the electrical supply of a shelf label, which is mounted on the shelf edge strip corresponding to the conductor loop, contactlessly to the shelf label with the aid of the conductor loop. Here, "contactless" means that this takes place with the aid of an inductive coupling between two adjacently located conductor loops or coils. The shelf label can thus also have a conductor loop consisting of a single loop or a plurality of windings, that is to say, a coil. Furthermore, "corresponding to" means that the shelf label is positioned adjacently to the area spanned by the conductor loop and is located there substantially inside a zone delimited by the conductor loop. The conductor loop itself may be designed to be e.g. visible in the plane of the shelf edge strip or covered by a protective material strip. If the shelf label is inserted into the shelf edge strip, then the conductor loop or coil installed into the shelf label is automatically located in the zone that can be used for the inductive coupling between the two adjacently positioned conductor loops or coils. Preferably, in the shelf label inserted into the shelf edge strip, the areas spanned by the two conductor loops or coils (on one side belonging to the shelf edge strip and on the other side belonging to the shelf label) are orientated parallel to one another and located at a spacing of less than one millimetre up to a few millimetres. To avoid impeding the inductive coupling, the shelf edge strip itself is manufactured from a suitable material, preferably plastic.

The perimeter of the conductor loop may for example extend along the entire length of the shelf edge strip and the entire height of the shelf edge strip. Preferably, the area spanned by the conductor loop will however be somewhat smaller than the area of its front side defined by the physical dimensions of the shelf edge strip. The at least one conductor loop is preferably located inside the channel of the shelf edge strip, into which the shelf labels are inserted, and integrated into the wall of the channel there, which in the case of the inserted shelf label runs correspondingly (adjacently) to the rear wall thereof. To realize the conductor loop, a single conductor track running round or a conductor track running around multiple times in a coil-like manner, that is, having multiple windings, can be provided. The conductor loop has a loop connector at each of its two ends, to which the supply device is connected.

The shelf edge strip may be equipped with a single conductor loop. However, it has proven advantageous when a plurality of conductor loops is formed along the longitudinal extent of the shelf edge strip, each of which conductor loops is coupled by itself to the supply unit (as mentioned), and the supply unit is designed for selective energy transmission with the aid of each of the conductor loops. This enables the optional energy supply for a single shelf label or a group of shelf labels. Depending on the implementation, for example, 2 or 3 or up to 15 or even considerably more conductor loops can be realized along the shelf edge strip. These conductor loops are positioned next to one another along the longitudinal extent of the shelf edge strip and their in each case two loop connectors are guided along the shelf edge strip to the supply device and there electrically conductively connected to the same. The longitudinal extent of the zone covered by the respective conductor loop at the shelf edge strip may be identical for all conductor loops. Thus, along the shelf edge strip, many zones may be defined located close together, the respective longitudinal extent of which is orientated to the longitudinal extent of the shelf label that is used on the shelf edge strip, wherein the longitudinal extent is usually a few cm, such as e.g. 8-12 cm. This allows the individual (selective) inductive coupling with each individual shelf label at (almost) any desired positions along the shelf edge strip. This is advantageous if the positioning of the shelf label should take place as flexibly as possible and in spite of that an inductive coupling, which is as individual as possible, should be possible with each shelf label. However, larger zones may also be provided, in which a plurality of shelf labels can then be located, which can then form an inductive coupling together with the relevant conductor loop. This configuration can be used if the exact position of the respective shelf label does not come into consideration. Such a case results, if e.g. a plurality of identical products are placed on a shelving unit over a relatively long section or the entire length of the shelving unit and the same information for these products is always presented by a plurality of shelf label displays placed at relatively large distances from one another along the longitudinal extent of the shelf edge strip. However, mixed configurations of relatively short zones and, relative thereto, also relatively long zones may also be present along the shelf edge strip.

The conductor loops may all be used together, that is to say simultaneously, for energy transmission by the supply device. However, this means a correspondingly complex design for the electronics of the supply device. Therefore, it has proven particularly advantageous if the supply unit is designed for multiplexing the energy transmission via the conductor loops. In this case, it is always only one single conductor loop, which is selected electronically, that is used for energy transmission.

As already explained analogously in connection with the shelf label, the supply unit can be designed differently in terms of its interface suitable for energy transmission. However, the supply unit is preferably designed as a second NFC interface for the contactless energy supply of a shelf label, the at least one conductor loop being a constituent of the NFC interface that is intended for contactless energy transmission (as well as for contactless communication).

Quite generally, it is to be determined here, that the conductor loop therefore realizes an inductor, which is used for inductive coupling with the corresponding inductor on the side of the shelf label. The conductor loop can otherwise have a single winding or even a plurality of windings.

Furthermore, the at least one conductor loop can be integrated into the shelf edge strip or fastened on the same. The integration into the shelf edge strip is advantageous if the shelf edge strip is for example manufactured from plastic and the conductor loop is integrated there as soon as during e.g. injection moulding, that is to say during the manufacture of the shelf edge strip. The conductor loop can however also be fastened on the surface of the shelf edge strip, e.g. by means of adhesive bonding. In particular if many conductor loops, which are arranged next to one another, are required and accordingly also many supply lines are to be considered, it has proven advantageous if the conductor loop(s) is (are) formed on a printed circuit board. This printed circuit board can then be integrated as a separate component into the shelf edge strip or fastened on the same. Also, the shelf edge strip can be constructed in such a manner that the printed circuit board can be replaced, so that it is possible to easily react to a wide range of different requirement profiles in shelf planning with very different conductor loop configurations, which can be realized e.g. on a single printed circuit board or on different printed circuit boards. Particularly preferably however, the shelf edge strip itself has a conductor loop mount. This may be constructed in such a manner that it is located e.g. on the front side of the shelf edge strip, that is to say where the rear side of the shelf label is as close as possible to the shelf edge strip in the state where the shelf label is fastened on the shelf edge strip. The conductor loop mount can however also run on the rear side of the shelf edge strip, corresponding to the region of the shelf edge strip where the shelf label can be attached, which may entail a better accessibility of the conductor loop for maintenance purposes or else ensures an unparalleled protection from damage. Finally, there, the conductor loop is also hidden from the view of the customers of a supermarket. Structurally, the conductor loop mount can be realized e.g. by a gap-like depression in the e.g. plastic material of the shelf edge strip, into which depression the conductor loop is inserted. Thus, the shape of the conductor loop as well as the exact positioning thereof can also be defined as precisely as possible without further measures (such as e.g. the previously mentioned printed circuit board and the positioning thereof). Also, the conductor loop positioned on the rear side can be electrically conductively connected at practically any desired point to electronics of the supply device, without consideration having to be given to the position of the shelf labels positioned on the front side of the shelf edge strip. The depression may also have a snap or fixing mechanism, which fixes the conductor loop in its intended position. Also the depression may be constructed in such a manner that it can accommodate a plurality of windings of the conductor loop, wherein these can be arranged next to one another and/or above one another in the depression.

Also, one is not bound by the limits of the production process for printed circuit boards during the integration of a conductor loop mount directly into the shelf edge strip (that is into the material thereof) during the planning or production of the conductor loop and can therefore also realize conductor loops with a length which far exceeds those for current printed circuit boards of approx. one metre. It is therefore absolutely possible to realize a conductor loop which extends along an entire shelf edge strip, which may be several metres long.

It has proven particularly advantageous if exactly one single electronic supply device is used per shelf edge strip. This makes it possible to realize a focused energy supply only for this one shelf edge strip.

In this context, it has furthermore proven particularly advantageous if the electronic supply device is integrated into the shelf edge strip or is fastened on the same. Thus, a shelf edge strip with individual electronic energy supply can be realized. In this case, the supply device can e.g. also be constructed directly on the printed circuit board or connected to the same as a module or mechanically coupled to the shelf edge strip as a module and electrically conductively connected to the conductor loop of the shelf edge strip. As a result, the shelf edge strip as a whole, including its supply device, can be taken out and recommissioned at a different location without problem.

The energy supply to the supply device can be realized in different ways. For instance, the supply device can for example take place via an Ethernet cable connecting the supply device to other communication devices, the supply voltage also being provided via this Ethernet cable. However, a separate supply station (e.g. a power supply unit) can also be provided for the energy supply to the electronic supply devices. This supply station preferably supplies a group of electronic supply devices, particularly preferably for an entire shelving unit, in particular for a group of shelving units. This allows a supply infrastructure to be constructed in a modular manner for a single shelving unit or for geographically or thematically sorted groups of shelving units, or else the number of supply stations to be reduced to a necessary minimum.

Particularly preferably, however, the electronic supply device is designed such that it can be supplied with energy wirelessly, and the supply station for its part is designed as a wireless energy source for in particular directional wireless energy supply of the electronic supply device. With the aid of the supply station, therefore, a contactless, targeted energy transmission to the supply device takes place. This allows a substantially cable-free supply infrastructure for the shelf labels fastened to the shelf edge strip on the one hand and for the supply device provided for supplying the shelf labels on the other hand. In fact, the fitter of the system is spared the cabling between the actual energy source and the respective shelving unit These circumstances allow the shelving units to be positioned substantially as desired within the business and the shelf edge strips to be positioned as desired and simply on a wide variety of shelving units and also to be exchanged between the shelving units. This type of energy transmission and the technology on which it is based is referred to using the term "power over WiFi". Wireless energy sources equipped with this technology can be installed for example on the ceiling of business premises and selectively supply, within a range of up to a maximum of 10 metres, the supply devices assigned to the respective shelf edge strips and located within said range with the aid of powerful, that is, focused wireless signals directed towards said supply devices.

Furthermore, the electronic supply device can also be designed for contactless communication with the shelf label using the technology which is also used for energy transmission to the shelf label. The aforementioned NFC technology is preferably used again for this. This allows as optimal a use as possible of the available electronic components for both the contactless energy transmission and the contactless communication over relatively short distances, as is the case for shelf labels fastened to the shelf edge strip.

In addition to the NFC interface which is provided for communication with the shelf labels, the supply device has a further interface, which is intended for communication with an access point. This further interface can be designed for wireless communication. For the wireless communication with the access point, a time slot communication method can be used, in particular a proprietary time slot communication method such as that known from WO2015/124197, pages 2 to 4, the specific disclosure of which is hereby incorporated by reference. However, a communication protocol based on the standards or specifications ZigBee, Bluetooth or WiFi etc. can also be used for wireless communication. The second interface can however also be designed for wired communication, so that communication can take place via an Ethernet cable. As mentioned, the necessary supply voltage can also be supplied via the Ethernet cable, which is referred to in the technical field using the term "power over Ethernet" or "PoE" for short.

The supply device thus realizes in communication terms a "gateway" for all the shelf labels mounted on the relevant shelf edge strip.

The access point acts as a higher-level interface between the shelf labels of an IT infrastructure controlling the shelf labels, such as a server with corresponding software application and the like, for example. In a wireless system, a group of shelf labels is typically assigned wirelessly (logically) to such an access point so that communication with this group of shelf labels only takes place via this access point. In a business premises, for example of a supermarket, a plurality of such access points can be installed, each access point being provided for communication with shelf labels logically assigned to it, which are located within a geographical region (within wireless range) around the access point.

In addition to this functionality, the access point can also have the supply station, which is designed for the directed, wireless energy supply of the electronic supply device.

In summary, the supply device implements, for the shelf edge strip in question, a combined energy supply and communication supply device for the shelf labels fastened to the relevant shelf edge strip. The supply device is thus configured or designed for local contactless energy transmission and local contactless communication with shelf labels fastened to the shelf edge strip. Such a supply device can also be referred to as a shelf edge strip control device or shelf edge strip controller, because it controls all the activities of the shelf labels mounted on the relevant shelf edge strip, which includes the display behaviour, the communication behaviour and the respective energy supply.

It has also proven particularly advantageous when the electronic supply device is designed for receiving and forwarding a unique identifier of the shelf label involved in the communication, for the purpose of determining the position of the relevant shelf label.

If a plurality of shelf labels are arranged within a conductor loop of the shelf edge strip or if a plurality of shelf labels are supplied with energy via a single conductor loop at the same time, precautions must be taken to ensure that the respective identifier is received. To this end, the shelf labels can for example be programmed such that they output their identifier (once or multiple times) at randomly selected times within a time window in order to ensure individual receipt at the supply device. An anti-collision method known for example from RFID technology can likewise be used during this contactless transmission in order to ensure individual receipt at the supply device.

The unique identifier is preferably forwarded to a data processing device, such as a server on the business premises, which carries out communication with the individual electronic shelf labels.

The server can also store the logical link between products placed on the respective shelving unit and the shelf label displays positioned there and thus ensure that the respective shelf label display presents the information belonging to the relevant product.

The server is also informed of the position or extent of the respective conductor loop on the shelf edge strip and is also informed, by the supply device together with the identifier, of which conductor loop was used to acquire the identifier from the shelf label. Three-dimensional digital maps of the positions of all the shelf labels in a business premises can thus also be created. This relates both to the shelf labels configured to display information and analogously to the other possible functionalities of the shelf label that are mentioned.

The application thus also discloses an "intelligent" shelf edge strip, to which at least one electronic shelf label can be fastened and which has:
  at least one conductor loop formed on the shelf edge strip, and
  a supply device, which is designed for contactless energy supply to the at least one shelf label, the conductor loop being a constituent of the supply device and being used for the contactless supply of energy to a shelf label, which is mounted on the shelf edge strip corresponding to the conductor loop.

The supply device for energy supply can preferably be realized with the aid of an NFC interface, as already explained above, the conductor loop being a constituent of the NFC interface.

The electronics of the various devices of the system, just like also the interface etc. thereof can be realized with the aid of a very wide range of passive and also active electronic components in a discrete and also integrated manner. Preferably, a microprocessor with corresponding peripheral components or a microcontroller, upon which a software for providing the various functionalities is executed, is used in this case. Also, what are known as ASICs (Application-Specific Integrated Circuits) can be used.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference numbers. In the figures.

DESCRIPTION OF THE EXEMPLARY EMBODIMENTS

Figure 1:
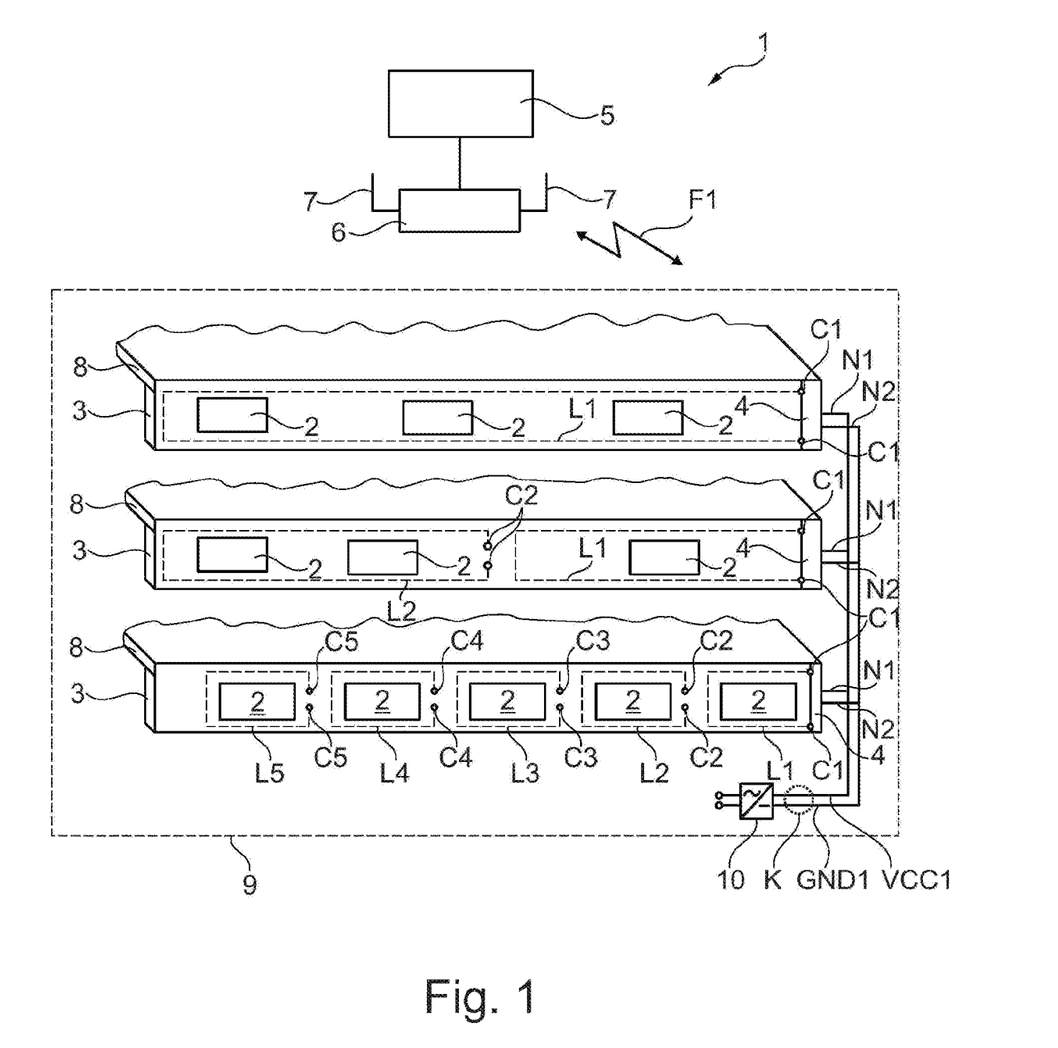
FIG. 1 schematically shows an electronic shelf label system according to the invention in a first exemplary embodiment.

FIG. 1 illustrates a shelf label system 1, which comprises a number of identical electronic shelf labels realized as shelf label displays 2 and fastened to three "intelligent" shelf edge strips 3. Each shelf edge strip 3 has an electronic supply device 4. Also illustrated is a data processing device, which is realized with the aid of a server 5, which is connected in a wired manner to an access point 6, which has two antennas 7, for example. The supply devices 4 illustrated are in wireless contact with the access point 6 via first wireless signals F1. The image content of the shelf label displays 2 can thus be changed from the server 5, and where necessary associated status information can be requested from the shelf label displays 2 and transmitted to the server 5. Each of the shelf edge strips 3 is mounted on the front edge of an individual shelf 8. The three shelves 8 illustrated all belong to a shelving unit 9 indicated only very schematically. Different products can be placed on the shelf 8 but are not illustrated in the present case.

For the electrical supply of the supply devices 4, a separate power supply unit 10 assigned to the shelving unit 9 is provided as a supply station, which converts an input-side mains AC voltage (of e.g. 230 V) to a DC voltage suitable for the supply devices 4, as a first supply voltage VCC1 (of 12 V, for example) relative to a first reference potential GND1. This first supply voltage VCC1 is supplied to the supply devices 4 via their supply connectors N1 and N2 with the aid of a cable K.

The supply devices 4 are each illustrated schematically on the right-hand edge of the shelf edge strips 3, but this does not have to be the case. They can also be situated in other positions along the shelf edge strip 3. In the present case, the supply devices 4 are integrated into the shelf edge strips 3, that is to say, installed or inserted into a mounting slot (not illustrated here, but see FIG. 7), for example.

FIG. 1 also shows a first conductor loop L1 which is integrated into the top shelf edge strip 3 and is connected by way of its two (first) loop connectors C1 to the supply device 4 installed there. The middle shelf edge strip 3 has, in addition to the first conductor loop L1, a second conductor loop L2, which, like the first conductor loop L1, is connected by way of its two (second) loop connectors C2 to the supply device 4 installed there, but this connection is not illustrated in detail for reasons of clarity (see FIG. 3, however). The same applies correspondingly to the bottom shelf edge strip 3, which, in addition to the two aforementioned conductor loops L1 and L2, has a third, fourth and fifth conductor loop L3, L4 and L5, the two (third, fourth and fifth) loop connectors C3, C4 and C5 of which are connected to the supply device 4 installed there, wherein this connection is also not illustrated in detail for reasons of clarity (see FIG. 3, however).

The conductor loops L1 to L5 are integrated in the relatively flat structure of the shelf edge strip 3 with the aid of a printed circuit board (not illustrated here, but see FIGS. 3, 6 and 7), which supports the conductor tracks (in the present case only a single conductor track per conductor loop L1 to L5) of the conductor loops L1 to L5. The supply device 4 can be soldered to said printed circuit board or connected via cables or plug connectors, so that the loop connectors C1 to C5 are electrically contacted.

The shelf edge strip 3 is, just like the shelf label display 2, designed in such a manner that the shelf label display 2 can be inserted into the shelf edge strip 3 from the front and in the process locks with the same by means of a snap mechanism in such a manner that it can only be removed from the shelf edge strip 3 again with the application of considerable force. This can be realized for example with an upper guide strip 26 and a lower guide strip 27 (see FIG. 7) of the shelf edge strip 3, wherein at least one of the two guide strips 26 or 27, where necessary also both, can be bent slightly during insertion or removal of the shelf label 2. At the same time, the mechanism mentioned allows the shelf label display 2 to be displaced along the shelf edge strip 3 with only comparatively little force outlay and consequently placed easily at any desired position. A snap mechanism of the described type is known, for example, from WO2017/153481A1, FIG. 2, the lower and upper edges of the guide strips 26 and 27 in said document being provided with reference labels 12 and 13. Complementary to the guide strips 26 and 27, the shelf label display 2 can also have corresponding notches or recesses, slightly set back as seen from the front, along its upper and lower edges, into which the guide strips can snap. The guide strips 26 and 27 can also completely enclose the upper and lower edges of the shelf label display 2 in order to secure its fit on the shelf edge strip 3.

Figure 2:
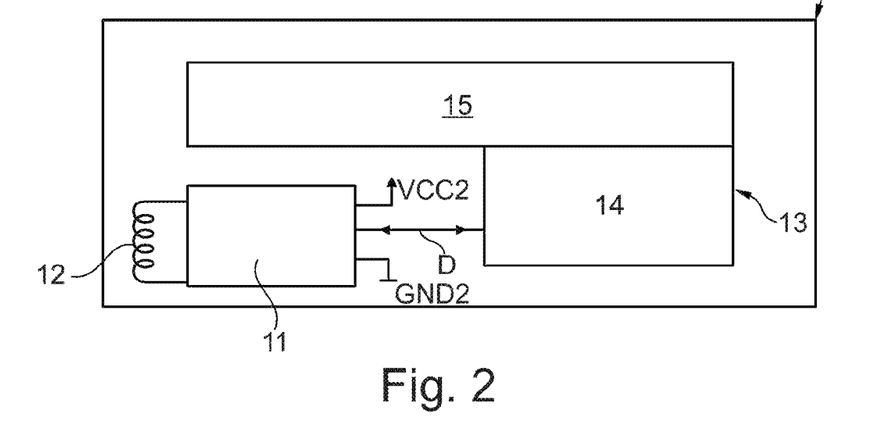
FIG. 2 schematically shows a block diagram of a shelf label display.

A block diagram of the shelf label display 2 is explained below using the FIG. 2.

The block diagram shows a first NFC interface 11 with its coupling coil 12. With the aid of the coupling coil 12, an inductive coupling is established with another NFC-enabled device, in the present case the supply device 4, specifically with the conductor loops L1 to L5 formed there, when the coupling coil 12 is brought correspondingly close to one of the conductor loops L1-L5, which is the case when the shelf label display 2 is attached to one of the shelf edge strips 3. During the inductive coupling, a second supply voltage VCC2 (relative to a local second reference potential GND2) is generated with the aid of the NFC interface 11 for the operation of the entire shelf label display 2, which activates the electronics of the shelf label display 2, so that contactless bidirectional communication of data D can also be carried out via its first NFC interface 11. A constituent of these electronics is also an NFC controller, which provides the entire NFC functionality, but is not shown here in detail, but is integrated in the first NFC interface 11.

The block diagram also shows a display unit 13, which is connected to the first NFC interface 11 and is divided into an electronic paper display controller 14 and an electronic paper display screen 15 which can be controlled therewith. With the aid of the controller 14, the data received is interpreted, the image content of the screen 15 is changed accordingly, where necessary, or else status information in the form of data D is output to the supply device 4 via the first NFC interface 11.

A block diagram of the bottom shelf edge strip 3 according to FIG. 1, particularly also the supply device 4, is discussed below using FIG. 3.

As mentioned, the (second) supply voltage VCC2 needed for operation is supplied via the supply connectors N1 and N2. If no external power supply unit 10 (see FIG. 1) is used, and instead the mains AC voltage is supplied directly, the supply device 4 can also have its own, internal power supply unit 16, which is indicated in the present case with dashed lines.

Figure 3:
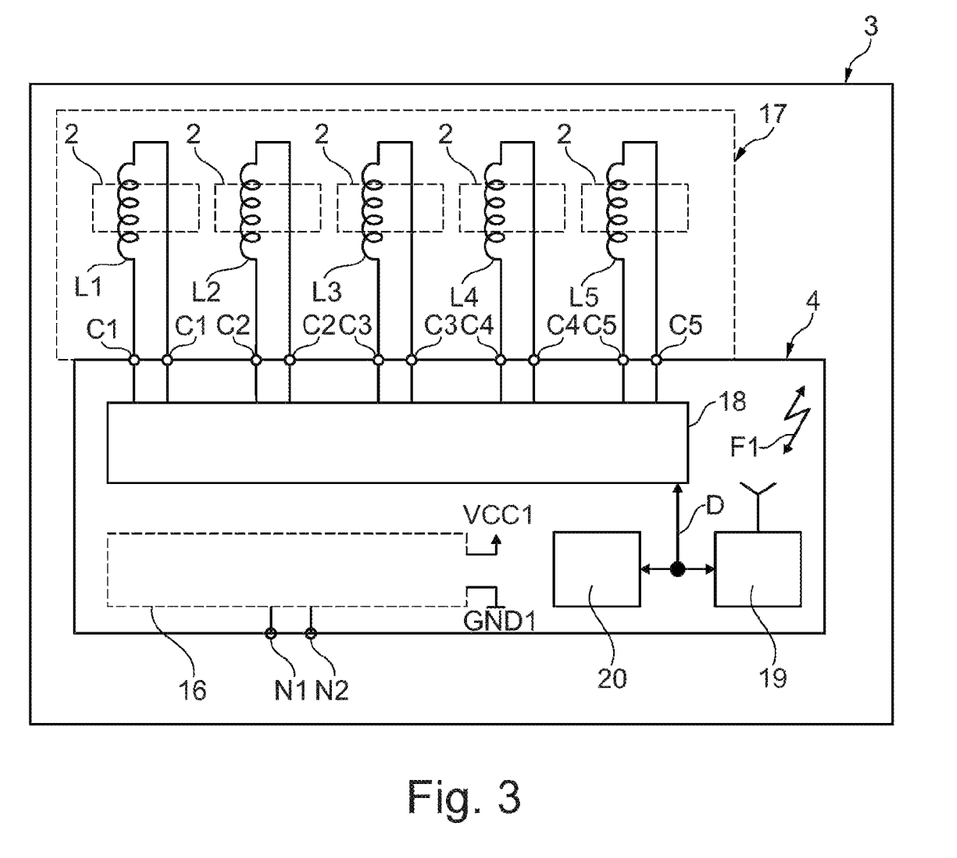
FIG. 3 schematically shows a block diagram of an "intelligent" shelf edge strip with a supply device.

In the visualization of FIG. 3, the aforementioned printed circuit board is also indicated, with reference numeral 17. As mentioned, the printed circuit board 17 supports the conductor loops L1 to L5; wherein in the present case these are designed with multiple loops or windings, which is indicated in each case with the symbol for an electric coil.

Corresponding to the position of the respective conductor loop L1 to L5, the shelf label display 2 respectively positioned there is also illustrated and indicated. In contrast to FIG. 1, the electrical connection of the loop connectors C1 to C5 to the supply device 4, specifically to an electronic supply unit realized as a (second) NFC interface 18, is specifically illustrated. This second NFC interface 18 also has its own NFC controller (not illustrated). If an inductive coupling with the first NFC interface 11 of the shelf label display 2 is present, the second NFC interface 18 is designed for the contactless transmission of electrical energy to the shelf label display 2 and for bidirectional communication of data with the shelf label display 2 activated by energy supply. The conductor loops L1 to L5 are multiplexed with the aid of the second NFC interface 18 which is specifically designed to do this, therefore only one of the conductor loops L1 to L5 is ever in use.

The supply device 4 furthermore has an access point communication interface 19, which is designed for wireless communication with the access point 6 illustrated in FIG. 1. To this end, the access point communication interface 19 has electronics designed therefor and an antenna configuration, which can also comprise multiple antennas. To control the internal processes, such as the energy supply to the shelf label display 2 and communication with the shelf label display 2, and communication with the access point 6, the supply device 4 has a control unit 20. The control unit 20 is realized with the aid of a microcontroller, which is connected to the second NFC interface 18 and the access point communication interface 19 via a bidirectional data bus.

Figure 4:
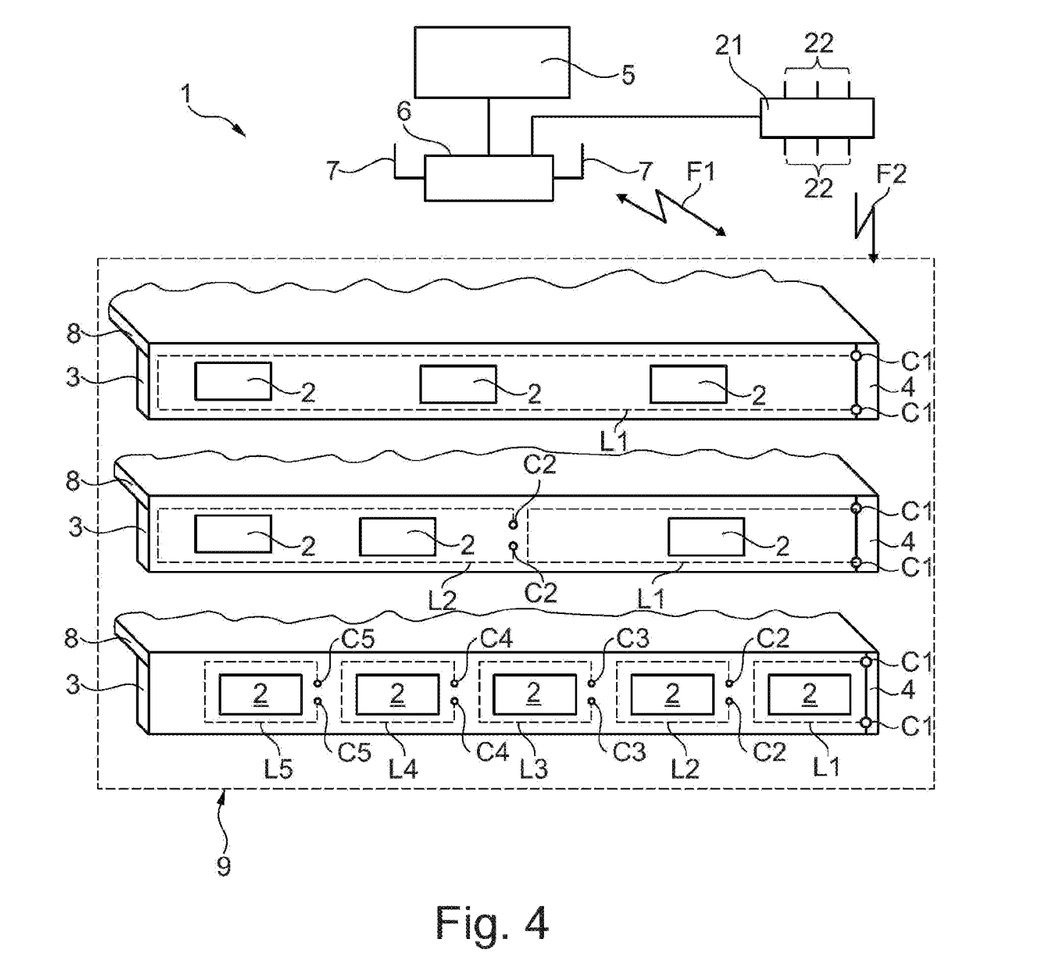
FIG. 4 schematically shows a second exemplary embodiment of the shelf label system.

FIG. 4 shows a further embodiment of the system 1. In contrast to the system 1 illustrated in FIG. 1, in this case the power supply unit 10 is missing. In the present case, the individual supply devices 4 are supplied with electrical energy with the aid of a supply transmitter 21 (previously referred to as a wireless energy source) as the supply station, which is designed to transmit electrical energy at a certain transmitting power, such as 5 W for example, to a receiver (that is, to one of the supply devices 4) with the aid of a focused or directional (second) wireless signal F2. Such a supply transmitter 21 also has a multiplicity of antennas 22 (in this case, six of them are illustrated), with the aid of which the direction of the energy transmission (ultimately the propagation of the second wireless signal F2) can be set relatively precisely so that the energy-transmitting second wireless signal F2 arrives precisely at the respective supply device 4. This energy transmission is known under the term "power over WiFi".

Figure 5:
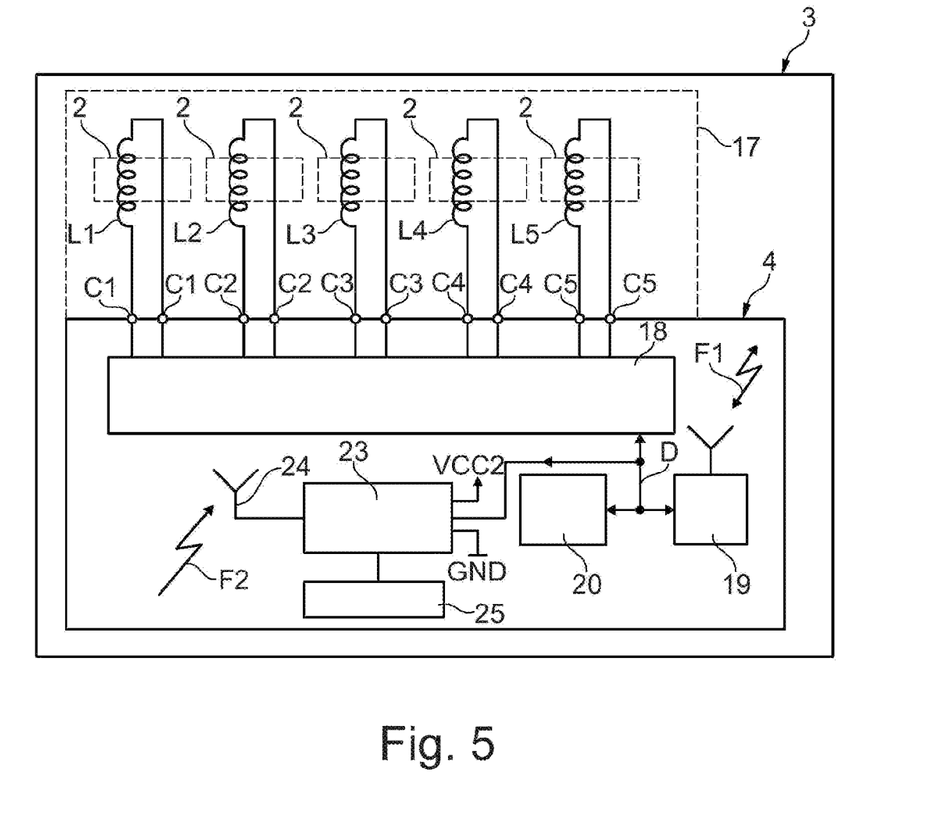
FIG. 5 schematically shows a second exemplary embodiment of the "intelligent" shelf edge strip.

To be able to use this type of energy transmission, the supply device 4 used in the exemplary embodiment of FIG. 5 has a supply receiver 23 which is suitable for receiving the second wireless signal F2 and is equipped with an antenna configuration 24 (which can have multiple antennas) and electronics, which are designed to receive the second wireless signal F2 and to store the energy transmitted therewith in an internal electrical energy storage device 25 (chargeable battery, rechargeable battery) and thus to generate a second supply voltage VCC2 relative to a second reference potential GND2.

During operation, the supply device 4 can query or monitor the state of charge of the energy storage device 25, for example with the aid of its control unit 20. As soon as the state of charge falls below a certain level, the control unit 20 can request a (re)charge with the aid of the first wireless signal F1. This request is received by the access point 6 and can be forwarded directly to the supply transmitter 21 or forwarded to the supply transmitter 21 by involving the server 5, depending on the implementation. Since the exact geographical position (the three-dimensional coordinates) of each of the supply devices 4 and their unique identifier is known in the system 1 (e.g. the server 5), the supply transmitter 21 can send the second wireless signal F2 in a precisely directed manner towards the position of the respective supply device 4 requesting charging. The second wireless signal F2 is received there, and the energy transmitted therewith is used to charge the internal energy storage device 25 there.

The shelf edge strip 3 described here is therefore designed for contactless communication with the shelf label displays 2 installed on it and with an access point 6 assigned wirelessly to it and for contactless provision of energy within the meaning of energy storage for its own operation and for the energy supply to the respective shelf label display 2, while the said shelf label display 2 is in a communication state and/or in an update state of its screen 15 or its electronics are generally active.

It should also be mentioned at this point that the supply transmitter 21 can also be installed in the access point 6.

Figure 6:
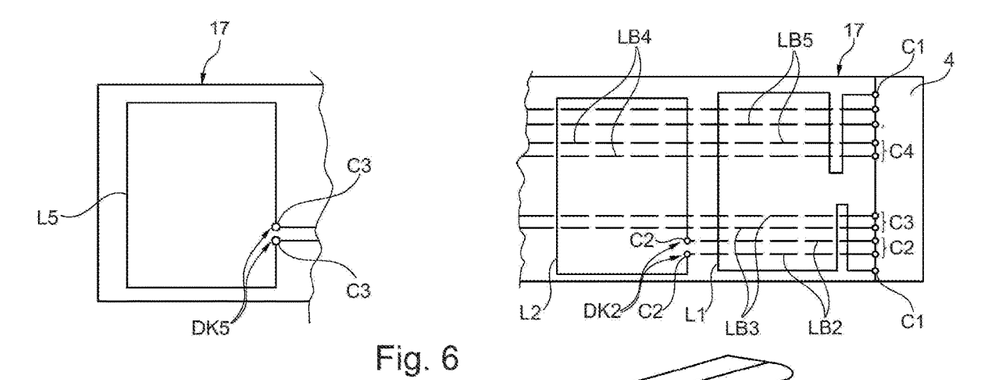
FIG. 6 schematically shows a printed circuit board of the "intelligent" shelf edge strip.

FIG. 6 shows a printed circuit board 17 which has conductor tracks on both sides. For reasons of clarity, only three of the five conductor loops L1-L5 are illustrated. The conductor loops L1, L2 and L5, which have a large area, can be seen on the front. On the rear, the conductor tracks LB2-LB5, running close together, of the respective loop connectors C2 and C5 can be seen, which run along the longitudinal extent of the printed circuit board 17. The loop connectors C1 run on the front side. The loop connectors C1-C5 are all connected to the supply device 4. There are vias DK2 and DK5 from the front to the rear in the places where the loop connectors C2 and C5 end at the conductor loops L2 and L5, so that the conductor loops L2 and L5 are electrically conductively connected to their loop connectors C2 and C5. The same applies correspondingly to the conductor loops L3 and L4, which are not shown, their loop connectors C3 and C4, their conductor tracks LB3 and LB4, and the two vias DK3 and DK4, which are likewise not shown. The supply device 4 indicated on the printed circuit board 17 can be attached, for example, to the rear of the printed circuit board 17. The electronic components of its electronics can also be soldered directly to the printed circuit board 17.

Figure 7:
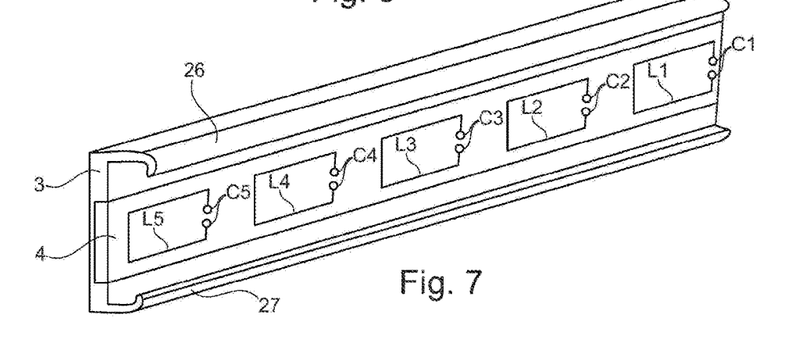
FIG. 7 schematically shows the printed circuit board according to FIG. 6 integrated in the shelf edge strip.

FIG. 7 shows a possibility of mechanically integrating the printed circuit board 17 in the shelf edge strip 3. The printed circuit board 17 forms a part of the wall of a receiving slot, which is used to receive a number of shelf label displays 2. At the point where the printed circuit board 17 is to be attached, the receiving slot has a depression which corresponds to the thickness of the printed circuit board 17 and into which the printed circuit board 17 is inserted so that its front runs substantially planar with the rest of the wall of the receiving slot. On the front of the shelf edge strip 3, the upper guide strip 26 is formed on the upper end and the lower guide strip 27 is formed on the lower end. These guide strips 26 and 27 can be bent slightly upwards and downwards so that the shelf label display 2 can latch in. At the same time, the shelf label display 2 can be displaced slightly along the shelf edge strip 3 and positioned completely freely. The accommodation of the supply device 4 on the rear of the printed circuit board 17 is advantageous if it should be possible to displace the shelf label displays 2 along the front of the shelf edge strip 3 unhindered, as is possible in the present case. For this case, the depression in the receiving slot must be adapted accordingly so that there is also space for the electronic components of the supply device 4.

Figure 8:
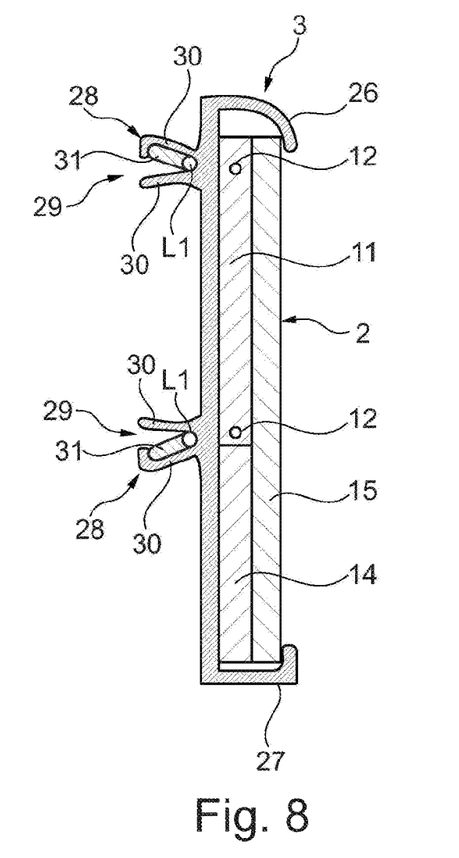
FIG. 8 schematically shows the "intelligent" shelf edge strip with direct integration of a conductor loop.

FIG. 8 shows the shelf edge strip 3 in a cross-sectional illustration, with a conductor loop mount 28 on its rear side, the conductor loop mount 28 being manufactured directly from the material of the shelf edge strip 3 (that is, from the plastic). The conductor loop mount 28 has a gap-like depression 29, into which a wire of the conductor loop L1 is inserted in an immovable manner. The gap-like depression 29 is flanked by two walls 30, which are dimensioned in such a manner that with their aid, a snap mechanism is realized, which fixes the wire in its intended position. A band- or strip-like material 31 (material band or strip) is inserted into the gap-like depression 29 for this purpose, which on the one hand presses the wire of the conductor loop L1 against the base of the depression 29 and on the other hand supports itself on a lug- or hook-like end of the outer wall 30 in each case or latches there.

Neither FIG. 7 nor FIG. 8 shows a fastening mechanism for the shelf edge strip 3, which allows the fastening of the shelf edge strip 3 on a different structure, such as e.g. a shelf 8, because this detail does not relate to the invention and can be realized in a wide range of ways that are known to the person skilled in the art.

Finally, it is once more pointed out that the figures previously described in detail are only concerned with exemplary embodiments, which can be modified in many different ways by the person skilled in the art, without departing from the scope of the invention. For the sake of completeness, it is also pointed out that the use of the indefinite article "a" or "an" does not mean that the relevant features cannot also be present multiple times.

The invention claimed is:

1. An electronic shelf label system (1), which comprises:
   at least one electronic shelf label (2), realized as an electronic shelf label display, the shelf label (2) being designed such that the shelf label is supplied with energy contactlessly, and
   at least one shelf edge strip (3), to which at least one shelf label (2) is fastened, and
   an electronic supply device (4) which is assigned to the shelf edge strip (3), and is designed to supply energy contactlessly to the at least one electronic shelf label (2) fastened there, wherein the supply device (4) comprises:
   at least one conductor loop (L1-L5) formed on the shelf edge strip (3), and
   an electronic supply unit (18), which is coupled to the at least one conductor loop (L1-L5), and is designed to transmit the energy for the electrical supply of a shelf label (2), which is mounted on the shelf edge strip (3) corresponding to the conductor loop (L1-L5), contactlessly to the shelf label (2) with the aid of the conductor loop (L1-L5).

2. The system (1) according to claim 1, wherein the shelf label (2) comprises a first NFC interface (11) for contactless energy supply thereof.

3. The system (1) according to claim 1, wherein the shelf label (2) comprises an energy-saving display unit (13) based on electronic ink or electronic paper technology.

4. The system (1) according to claim 1, wherein exactly one single electronic supply device (4) is used per shelf edge strip (3).

5. The system (1) according to claim 4, wherein the electronic supply device (4) is integrated into the shelf edge strip (3) or is fastened on the same.

6. The system (1) according to claim 1, wherein a separate supply station (10; 21) is provided for the energy supply of the electronic supply devices (4).

7. The system (1) according to claim 1, wherein
   the electronic supply device (4) is designed such that the electronic supply device (4) is supplied with energy wirelessly, and
   the supply station (21) is designed as a supply transmitter for the directed wireless energy supply of the electronic supply device (4).

8. The system (1) according to claim 1, wherein the electronic supply device (4) is also designed for contactless communication with the shelf label (2) using the technology which is also used for energy transmission to the shelf label (2).

9. The system (1) according to claim 8, wherein the electronic supply device (4) is designed for receiving and forwarding a unique identifier of the shelf label (2) involved in the communication, for the purpose of determining the position of the relevant shelf label (2).

10. The system (1) according to claim 9, wherein
   a plurality of conductor loops (L1-L5) is formed along the longitudinal extent of the shelf edge strip (3), each of which conductor loops is coupled by itself to the supply unit (18), and the supply unit (18) is designed for selective energy transmission with the aid of each of the conductor loops (L1-L5).

11. The system (1) according to claim 10, wherein the supply unit (18) is designed for multiplexing the energy transmission via the respective conductor loop (L1-L5).

12. The system (1) according to claim 9, wherein the supply device (4) comprises a second NFC interface as the supply unit (18) for contactless energy supply of a shelf label (2), wherein the at least one conductor loop (L1-L5) is a constituent of the second NFC interface intended for energy transmission.

13. The system according to claim 9, wherein the at least one conductor loop (L1-L5) is integrated into the shelf edge strip (3) or is fastened thereto.

14. The use of an electronic energy supply device (4) for contactless energy supply of at least one shelf label (2), wherein the shelf label is designed such that the shelf label is supplied with energy contactlessly, with a shelf edge strip (3) to which the at least one shelf label (2) is fastened, wherein the supply device (4) comprises:
- at least one conductor loop (L1-L5) formed on the shelf edge strip (3), and
- an electronic supply unit (18), which is coupled to the at least one conductor loop (L1-L5), and is designed to transmit the energy for the electrical supply of a shelf label (2), which is mounted on the shelf edge strip (3) corresponding to the conductor loop (L1-L5), contactlessly to the shelf label (2) with the aid of the conductor loop (L1-L5).

* * * * *